(12) United States Patent
Rajagopalan et al.

(10) Patent No.: US 12,131,162 B2
(45) Date of Patent: Oct. 29, 2024

(54) SEAMLESS PERIPHERAL SELECTION AND SWITCHING IN A WORKSPACE

(71) Applicant: Dell Products L.P., Round Rock, TX (US)

(72) Inventors: Vivekanandh Narayanasamy Rajagopalan, Bangalore (IN); Gokul Thiruchengode Vajravel, Bangalore (IN); Vivek Viswanathan Iyer, St Johns, FL (US)

(73) Assignee: Dell Products L.P., Round Rock, TX (US)

( * ) Notice: Subject to any disclaimer, the term of this patent is extended or adjusted under 35 U.S.C. 154(b) by 98 days.

(21) Appl. No.: 18/060,685

(22) Filed: Dec. 1, 2022

(65) Prior Publication Data

US 2024/0184563 A1 Jun. 6, 2024

(51) Int. Cl.
*G06F 8/60* (2018.01)
*G06F 1/26* (2006.01)
*G06F 8/654* (2018.01)
*G06F 8/656* (2018.01)
*G06F 9/4401* (2018.01)
*G06F 1/329* (2019.01)
*G06F 3/12* (2006.01)
*G06F 11/07* (2006.01)
*H04L 41/082* (2022.01)
*H04M 1/72409* (2021.01)

(52) U.S. Cl.
CPC ............ *G06F 9/4411* (2013.01); *G06F 1/266* (2013.01); *G06F 8/654* (2018.02); *G06F 8/656* (2018.02); *G06F 1/329* (2013.01); *G06F 3/1234* (2013.01); *G06F 3/1236* (2013.01); *G06F 11/0733* (2013.01); *H04L 41/082* (2013.01); *H04M 1/72409* (2021.01)

(58) Field of Classification Search
CPC .......... G06F 9/4411; G06F 1/329; G06F 8/65; G06F 11/0733; G06F 3/1236; G06F 3/1234; G06F 1/266; H04L 41/082; H04M 1/72409
See application file for complete search history.

(56) References Cited

U.S. PATENT DOCUMENTS

| | | | |
|---|---|---|---|
| 2005/0144616 A1* | 6/2005 | Hammond | G06F 8/65 717/173 |
| 2011/0285765 A1* | 11/2011 | Lamontagne | G06F 3/1236 347/3 |

(Continued)

OTHER PUBLICATIONS

KR 101728581, (translation), Apr. 19, 2017, 23 pgs <KR_101728581.pdf>.*

(Continued)

*Primary Examiner* — Tuan A Vu
(74) *Attorney, Agent, or Firm* — Kirton McConkie; Brian Tucker

(57) ABSTRACT

Seamless peripheral selection and switching can be provided in a workspace. When a peripheral is to be updated while it is in use, an agent can select another peripheral in the same device class and seamlessly switch to using the selected peripheral while the update is applied. The agent can then seamlessly switch back to using the updated peripheral after the update is complete. In some cases, an update can be applied to a peripheral before a user created a workspace that includes the peripheral.

20 Claims, 15 Drawing Sheets

(56) References Cited

U.S. PATENT DOCUMENTS

| | | | | |
|---|---|---|---|---|
| 2014/0300916 A1* | 10/2014 | Boldt | .................... | G06F 3/1234 |
| | | | | 358/1.14 |
| 2018/0359144 A1* | 12/2018 | Malaspina | ............ | H04L 41/082 |
| 2020/0218324 A1* | 7/2020 | Decamp | .................. | G06F 1/266 |
| 2021/0208631 A1* | 7/2021 | Benson | ............. | H04M 1/72409 |
| 2022/0261303 A1* | 8/2022 | Weaver | ............... | G06F 11/0733 |

OTHER PUBLICATIONS

JP 4484270 (translation), Jun. 16, 2010, 19 pgs <JP_4484270.pdf>.*
Ito et al., WO 2016006268, (translation), Jan. 14, 2016, 17 pgs <WO_2016006268.pdf>.*

* cited by examiner

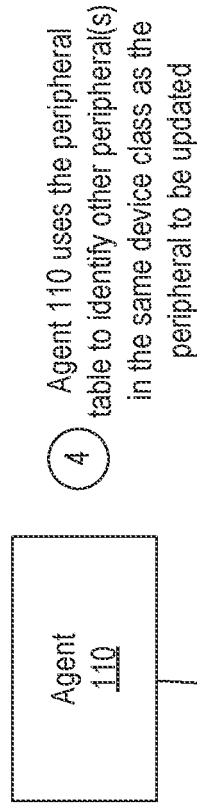

| Device Class | Name | Connectivity | Device ID | Capabilities | State |
|---|---|---|---|---|---|
| Camera | External 4K webcam | USB (External) | DeviceIDX | 4K, Pan Tilt, FOV, Auto Framing | Connected |
| | Internal webcam | MIPI (Internal) | DeviceIDY | 720p | Connected |
| Media (Audio) | Mobile Adapter Speakerphone | USB (External) | DeviceIDM | Speaker with MIC, integrated button controls | Connected |
| | Integrated Audio | USB (Internal) | DeviceIDN | Speaker with MIC | Connected |
| | BT Headset | Bluetooth (External) | DeviceIDK | Speaker with MIC, ANC | Paired, Not Connected |
| Display | 32" QHD monitor | DP/USB-C (External) | DeviceIDA | QHD | Connected |
| | Integrated Display | PCI (Internal) | DeviceIDB | 1080P | Connected |

④ Agent 110 uses the peripheral table to identify other peripheral(s) in the same device class as the peripheral to be updated

FIG. 5D

Peripheral List

| Device Class | Name | Connectivity | Device ID | Capabilities | State |
|---|---|---|---|---|---|
| Camera | External 4K webcam | USB (External) | DeviceIDX | 4K, Pan Tilt, FOV, Auto Framing | Connected |
| Camera | Internal webcam | MIPI (Internal) | DeviceIDY | 720p | Connected |
| Media (Audio) | Mobile Adapter Speakerphone | USB (External) | DeviceIDM | Speaker with MIC, integrated button controls | Connected |
| Media (Audio) | Integrated Audio | USB (Internal) | DeviceIDN | Speaker with MIC | Connected |
| Media (Audio) | BT Headset | Bluetooth (External) | DeviceIDK | Speaker with MIC, ANC | Paired, Not Connected |
| Display | 32" QHD monitor | DP/USB-C (External) | DeviceIDA | QHD | Connected |
| Display | Integrated Display | PCI (Internal) | DeviceIDB | 1080P | Connected |

*FIG. 6*

SEAMLESS PERIPHERAL SELECTION AND SWITCHING IN A WORKSPACE

CROSS-REFERENCE TO RELATED APPLICATIONS

N/A

BACKGROUND

A user may oftentimes use his or her user computing device in a workspace. In this context, a workspace can be viewed as an environment that includes a user computing device (e.g., a laptop) and peripherals that are connected to the user computing device. Such peripherals may commonly include external displays, a keyboard, a mouse, a webcam, a printer, a speaker, a fingerprint scanner, etc. Oftentimes, a workspace may include a wired or wireless dock by which the user computing device connects to some or all the peripherals.

A workspace may oftentimes be used for hybrid work scenarios. For example, a business may have an office space that includes hoteling cubes that can be assigned to, reserved by, or otherwise utilized by the business's employees as workspaces. In such cases, the business may allow its employees to connect their laptops to a dock in a particular hoteling cube where various peripherals may be available for use. Users may also employ workspaces when working from home.

When a user is using a workspace, it may be necessary to update a peripheral's driver or firmware. If the user happens to be using the peripheral when the update is to be performed, the user may be forced to use a different peripheral or wait until the update is complete. For example, while a firmware update is applied to an external webcam, a user may manually set an internal webcam as the preferred/default webcam within the workspace to allow the user to participate in a video conference while the firmware update is applied. Once the firmware update is completed, the user would need to manually set the external webcam as the preferred/default webcam within the workspace to resume using the external webcam for video conferences. This manual switching is tedious and error prone for some users.

Similar difficulties may arise when a feature of a preferred peripheral in the workspace is unavailable. For example, if a background blurring feature of an external webcam is not functioning, the user may need to manually configure the workspace to use a different webcam that provides a functioning background blurring feature or to use a software module that can apply background blurring to the raw video feed. Again, however, such configurations are tedious and error prone and may be beyond the capabilities of a typical user.

BRIEF SUMMARY

The present invention extends to systems, methods, and computer program products for seamless peripheral selection and switching in a workspace. When a peripheral is to be updated while it is in use, an agent can select another peripheral in the same device class and seamlessly switch to using the selected peripheral while the update is applied. The agent can then seamlessly switch back to using the updated peripheral after the update is complete. In some cases, an update can be applied to a peripheral before a user created a workspace that includes the peripheral.

In some embodiments, the present invention may be implemented as method for seamless peripheral selection and switching in a workspace. Peripherals available in a workspace can be identified by the peripherals' device classes. It can be determined that a first peripheral is to be updated while the first peripheral is in use. A second peripheral in the workspace that is in the same device class as the first peripheral can be identified. The first peripheral can be disabled to thereby cause the second peripheral to be used. The first peripheral can then be updated.

In some embodiments, the present invention may be implemented as computer storage media storing computer executable instructions which when executed implement a method for seamless peripheral selection and switching in a workspace. An update to a first peripheral can be received. It can be determined that the first peripheral is in use. One or more other peripherals having a same device class as the first peripheral can be identified. The first peripheral can be disabled. The first peripheral can then be updated.

In some embodiments, the present invention can be implemented as a method for updating peripherals. It can be detected that a user has booked a cube that includes a dock and peripherals. An update to one or more of the peripherals can be identified. A dock agent executing on the dock can be notified of the update to the one or more of the peripherals. The dock agent can obtain the update to the one or more of the peripherals. The update can then be installed before the user connects a user computing device to the dock.

This summary is provided to introduce a selection of concepts in a simplified form that are further described below in the Detailed Description. This Summary is not intended to identify key features or essential features of the claimed subject matter.

BRIEF DESCRIPTION OF THE DRAWINGS

Understanding that these drawings depict only typical embodiments of the invention and are not therefore to be considered limiting of its scope, the invention will be described and explained with additional specificity and detail through the use of the accompanying drawings in which:

FIGS. 5A-5G provide an example of how seamless peripheral selection and switching can be performed in a workspace; and FIG. 6 provides an example of a peripheral list that may be used in one or more embodiments of the present invention.

DETAILED DESCRIPTION

In this specification and the claims, the term "user computing device" should be construed as encompassing any computing device that a user uses in a workspace. A user computing device may oftentimes be a laptop but could also be a desktop, a tablet, a smart phone, etc. Embodiments of the present invention are described below in the context of a Windows-based user computing device. However, embodiments of the present invention could be implemented in other operating system environments and should not be limited by or to the Windows-specific examples.

Figure 1:
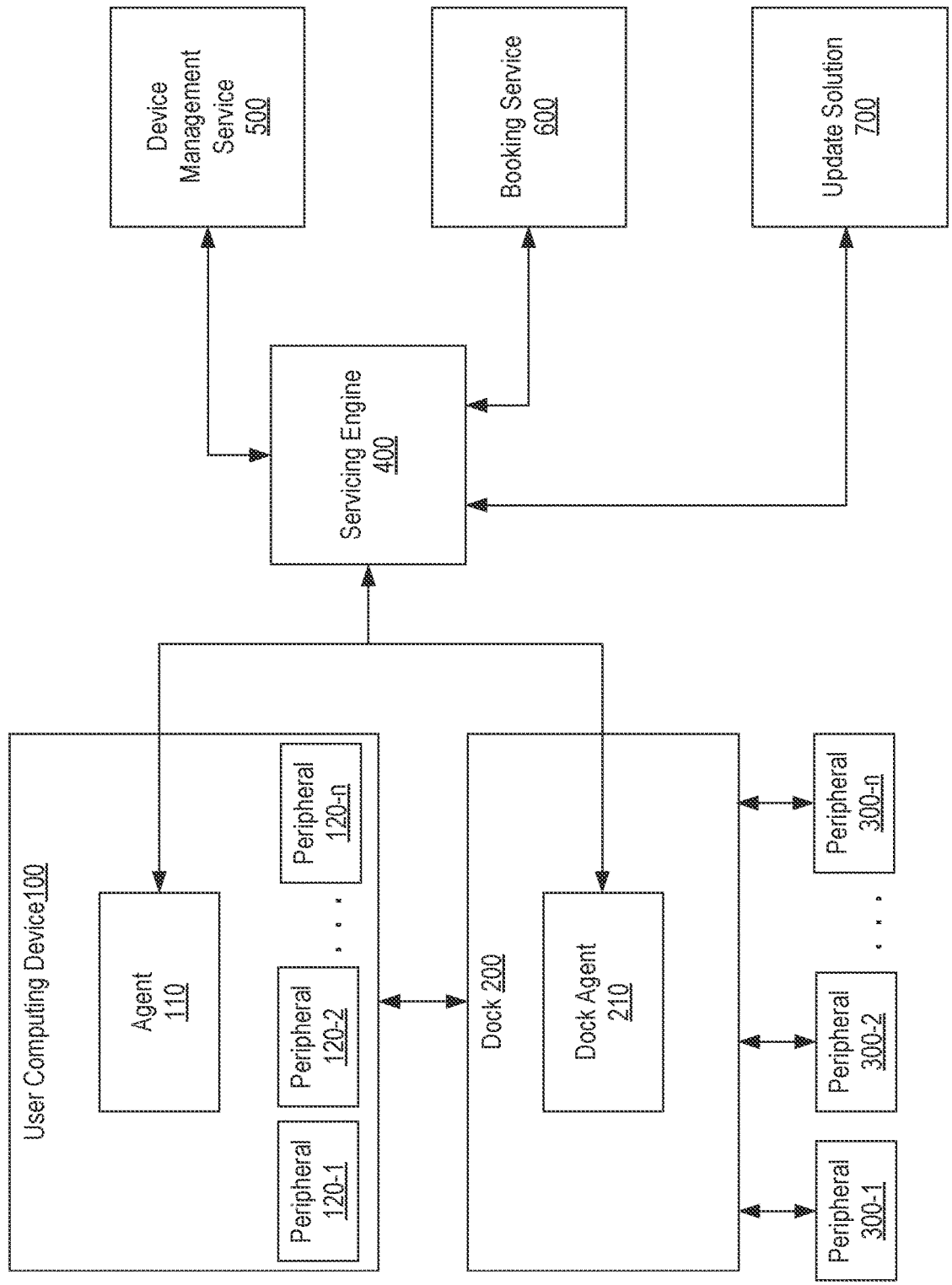
FIG. 1 provides an example of a computing environment in which embodiments of the present invention may be implemented.

FIG. 1 provides an example of a computing environment in which embodiments of the present invention may be implemented. This computing environment includes a workspace formed by a user computing device 100 having one or more peripherals 120-1 through 120-$n$ (generally and collectively peripheral(s) 120), a dock 200, and one or more peripherals 300-1 through 300-$n$ (generally and collectively peripheral(s) 300) that are connected to dock 200. The computing environment may typically include multiple such workspaces.

The computing environment also includes a servicing engine 400, a device management service 500, a booking service 600, and an update solution 700, all of which may typically be hosted in the cloud or otherwise on a server. Device management service 500 can represent any suitable solution for managing user computing device(s) 100. For example, device management service 500 could represent Microsoft InTune, VMware Workspace ONE, etc. Booking service 600 can represent any suitable solution by which users may book a cube or other location where he or she will use a workspace. For example, booking service 600 could represent AppSpace, Condeco, etc. Update solution 700 could include a catalog service for creating a catalog (or metadata) of updates (e.g., firmware and/or drivers) available for peripherals 300 and/or peripherals 120 and a repository storing such updates.

In accordance with embodiments of the present invention, servicing engine 400 can be configured to implement seamless peripheral selection and switching in a workspace. In some embodiments, servicing engine 400 may interface with an agent 110 on user computing device 100 and/or a dock agent 210 on dock 200 for this purpose. Servicing engine 400 may also leverage device management service 500 and booking service 600 as described below.

Figure 2:
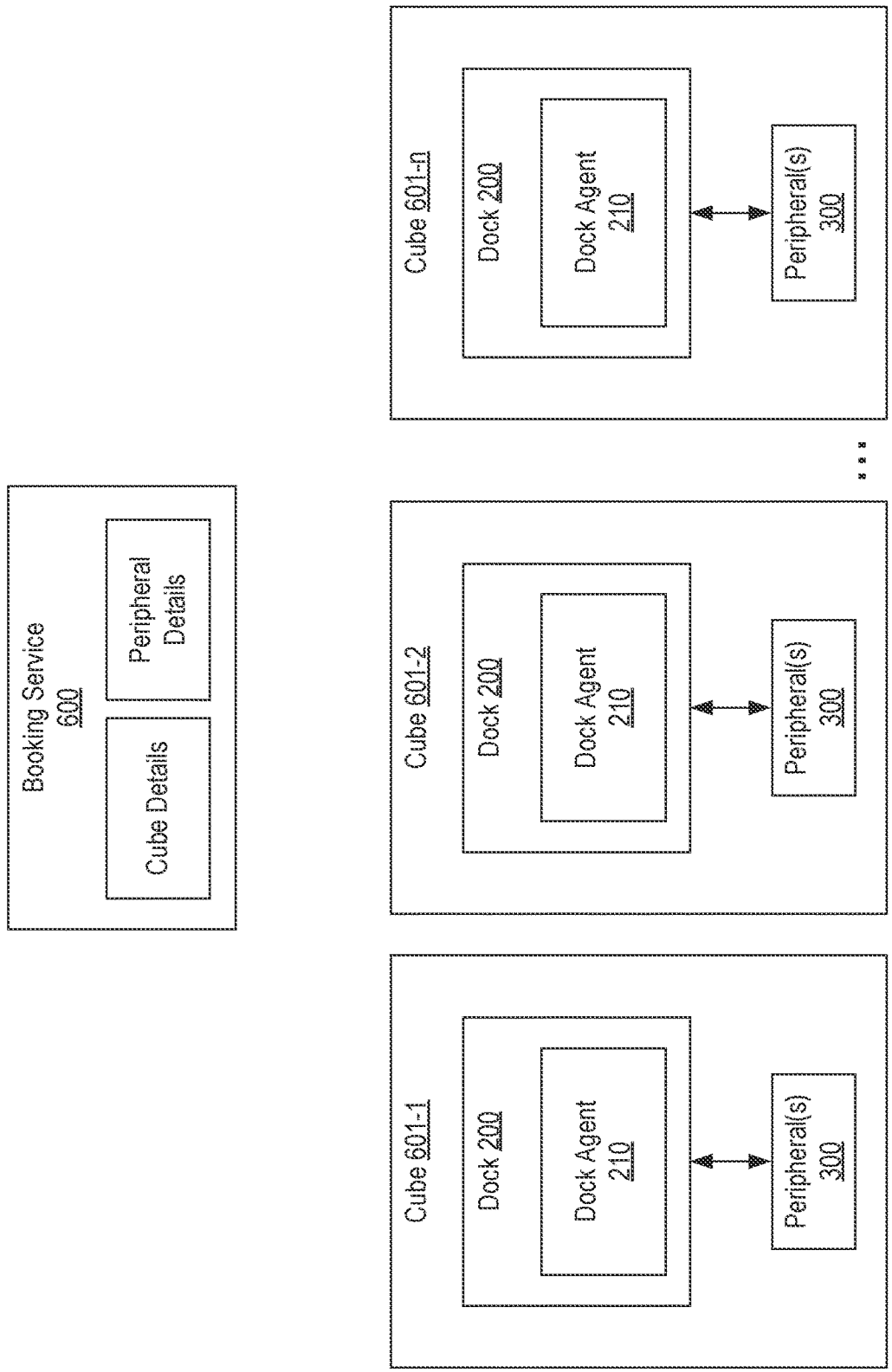
FIG. 2 provides an example of a hoteling environment in which embodiments of the present invention may be implemented.

FIG. 2 provides an example of a hoteling environment in which one or more embodiments of the present invention could implemented. This hoteling environment includes multiple cubes 601-1 through 601-$n$ (generally and collectively cube(s) 601), each of which may include a dock 200 and a set of peripherals 300. The term "cube" should be construed as encompassing any location where a user may create a workspace. Although each dock 200 is shown as including a dock agent 210, dock agent 210 need not be available on each dock 200 that may be used to form a workspace in which embodiments of the present invention are implemented. Booking service 600 can maintain cube details (e.g., an identifier for each cube 600) and peripheral details regarding the set of peripherals 300 in each cube 600. Booking service 600 can use the cube details and the peripheral details to enable users to book any of cubes 601. The users could then visit cubes 601 and connect their user computing devices 100 to docks 200 to form workspaces.

Embodiments of the present invention enable seamless peripheral selection and switching in a workspace such as any workspace that may be created in cubes 601. This seamless peripheral selection and switching can enable peripherals 300 and/or peripherals 120 to be serviced with minimal impact on the user experience while using a workspace. In some embodiments, this servicing may be performed on peripherals 300 before a user establishes a workspace using the peripherals. In some embodiments, this servicing may be performed on peripherals 120 and/or peripherals 300 while such peripherals are part of a workspace that the user is actively using.

Figure 3:
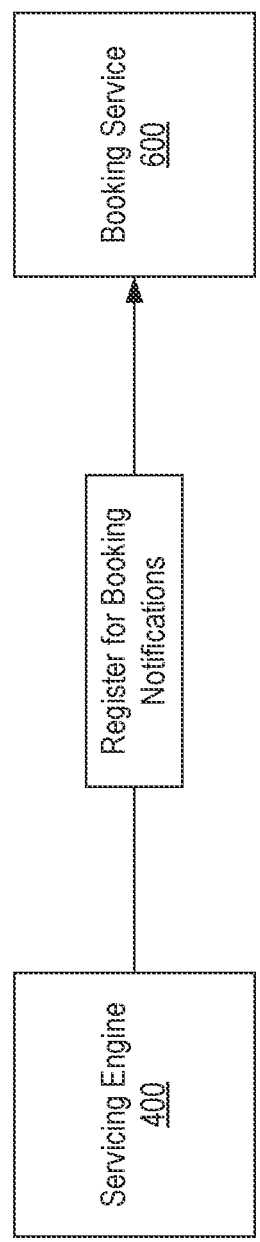
FIG. 3 provides an example of initialization functionality that a servicing engine may perform to enable embodiments of the present invention to be implemented.

FIG. 3 represents initialization functionality that servicing engine 400 may perform as part of one or more embodiments of the present invention. As shown, servicing engine 400 may register with booking service 600 to be notified whenever a user books a cube 601. For example, servicing engine 400 could register with booking service 600 to cause booking service 600 to provide a cube identifier, peripheral details, and booking details (e.g., the time booked) for any booking.

Figure 4A:
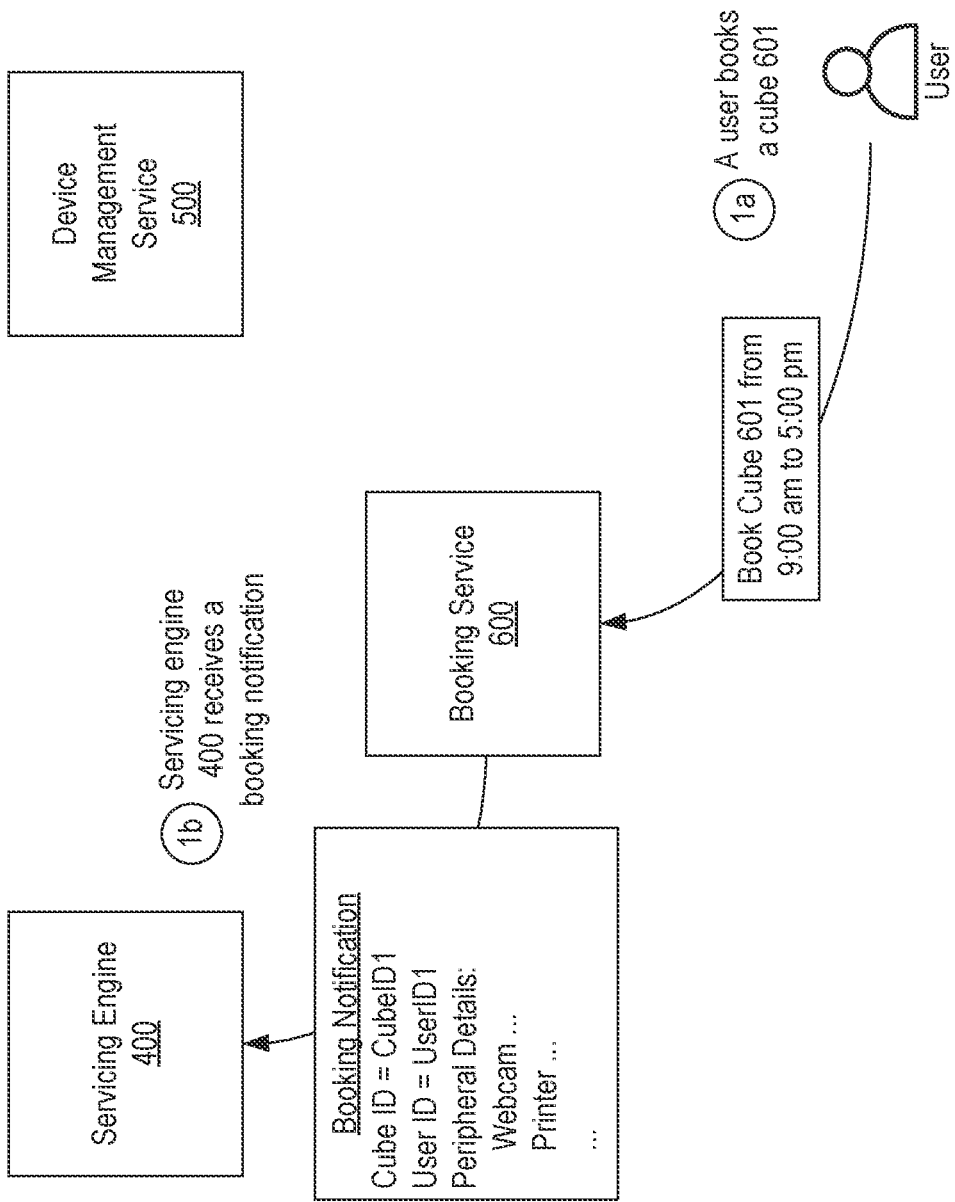
FIGS. 4A-4D provide an example of how one or more peripherals may be updated in response to a user booking a cube in which the peripherals are located.

FIGS. 4A-4D provide an example of how servicing engine 400 can apply a best compatible firmware configuration to a cube 601 in response to a user booking the cube. Turning to FIG. 4A, in step 1$a$, a user books a cube 601 via booking service 600. In step 1$b$, booking service 600 can send a booking notification to servicing engine 400. This booking notification may provide an identifier of the booked cube (CubeID1), an identifier of the user that booked the cube (UserID1), and details of peripherals 300, including dock 200, that are available in the cube. For example, these details could include a type and model of each peripheral. In some embodiments, servicing engine 400 could receive the details of peripherals 300 directly from dock agent 210 rather than as part of a booking notification.

Figure 4B:
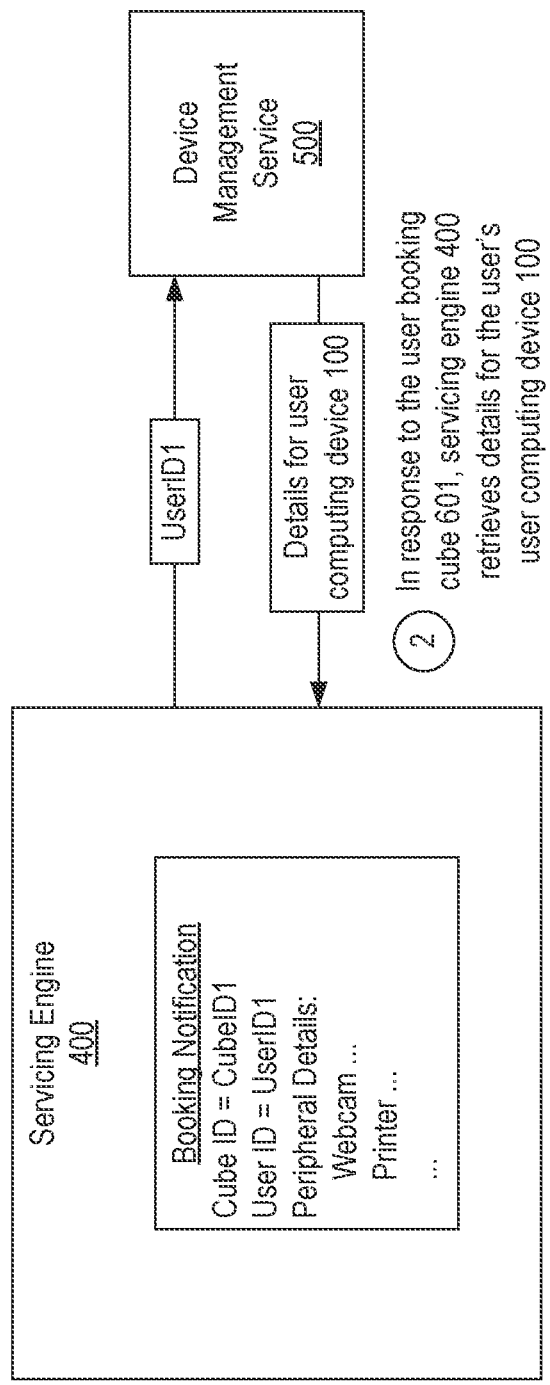

Turning to FIG. 4B, in step 2 and in response to receiving the booking notification, servicing engine 400 can retrieve details about user computing device 100 of the user that booked cube 601. For example, servicing engine 400 could use the user ID in the booking notification to query device management service 500 for information about the laptop of other user computing device that the user will use in cube 601 such as an operating system version, installed software, details of peripherals 120, user preferences, etc.

Figure 4C:
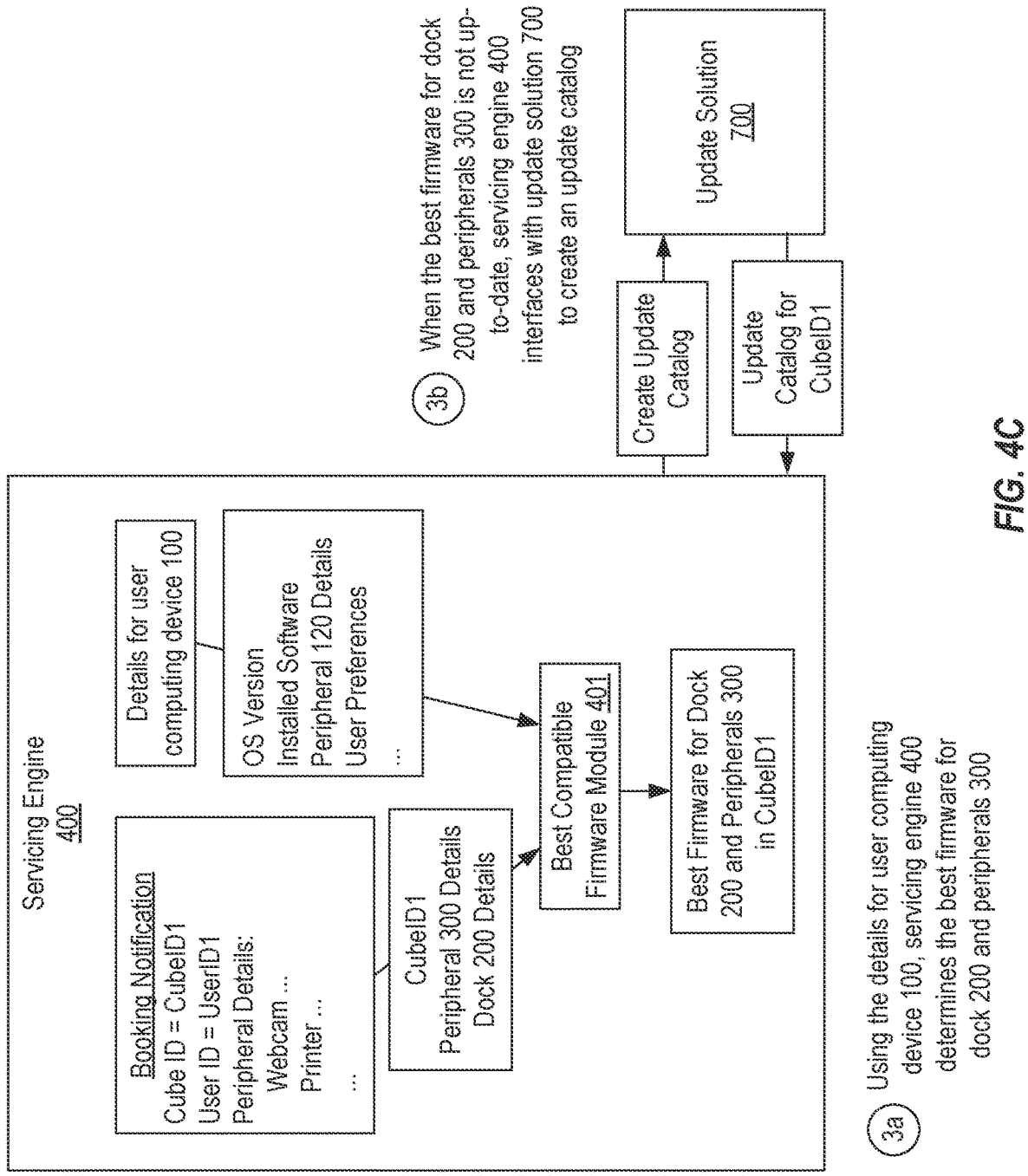

Turning to FIG. 4C, in step 3A, servicing engine 400 can use the peripheral details for the booked cube and the details for the user's user computing device 100 to determine the best firmware for dock 200 and peripherals 300 in the booked cube. For example, servicing engine 400 may include a best compatible firmware module 401 which identifies the set of firmware that is best suited for dock 200 and peripherals 300 when user computing device 100 is connected to dock 200 (i.e., the best firmware for the user that has booked the cube). Servicing engine 400 can then determine whether the existing firmware on dock 200 and peripherals 300 matches this best firmware. If not, in step 3$b$, servicing engine 400 can interface with update solution 700 to create a catalog defining the firmware to be updated to cause dock 200 and peripherals 300 to match the best firmware. In this context, the best firmware is determined based on the details of the user computing device 100 that will be used in the cube 601 to create a workspace. Therefore, the best firmware could be determined based on one or more of the OS version of user computing device 100, installed software on user computing device 200, peripherals 120, drivers for peripherals 120, user preferences, etc.

Figure 4D:
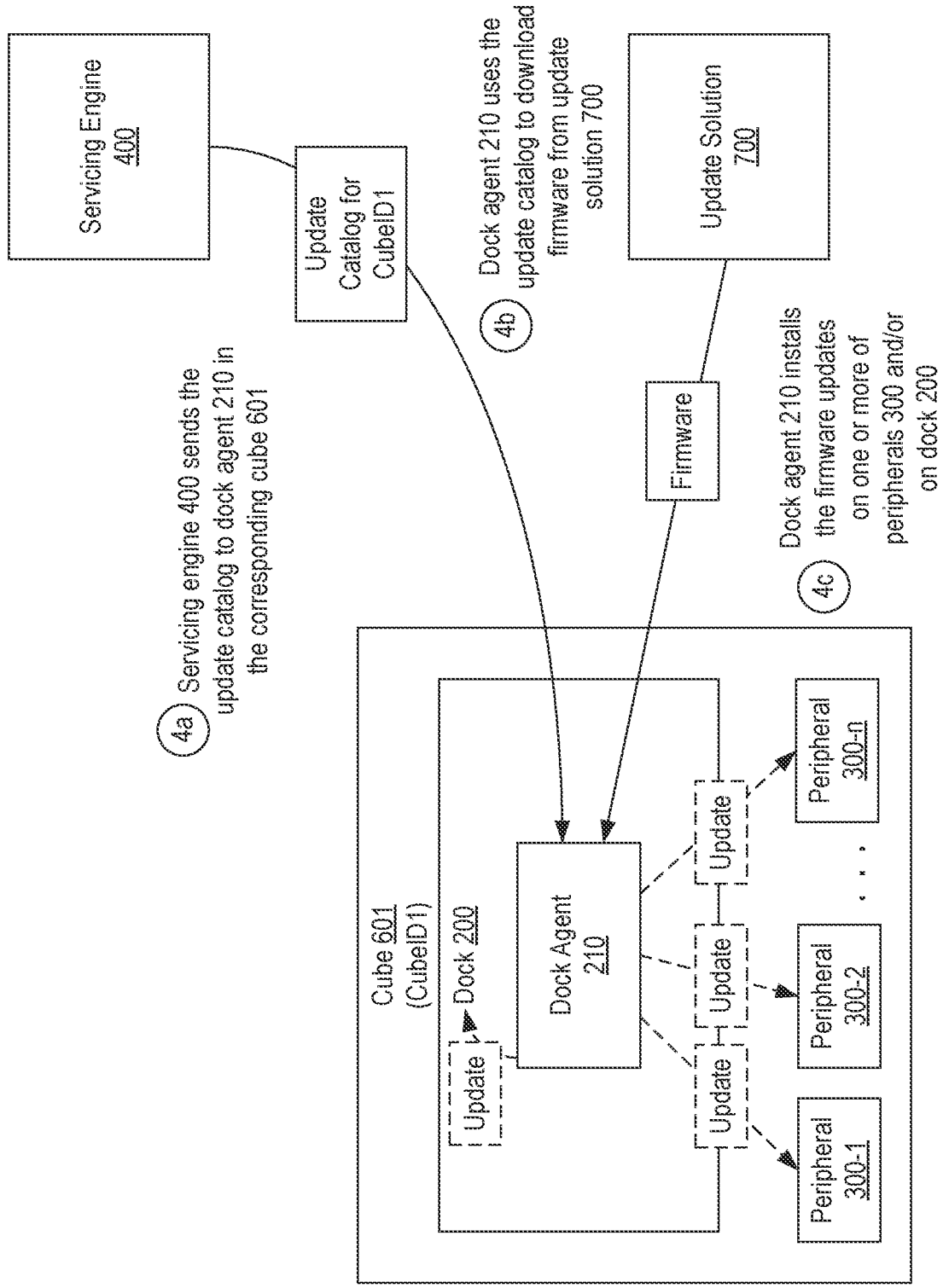

Turning to FIG. 4D, in step 4$a$, servicing engine 400 can send the update catalog to dock agent 210 on dock 200 in the booked cube 601. Notably, this step can be performed before the user's booking (e.g., before the user arrives at cube 601 and connects user computing device 100 to dock 200). In step 4$b$, dock agent 210 can use the update catalog to download the identified firmware from update solution 700. In some embodiments, dock agent 210 may determine whether there is an active workspace session before downloading the firmware so that another user's workspace session in cube 601 is not impacted. If another user has an active workspace session, dock agent 210 may wait until the session is terminated (e.g., until the current user disconnects his or her user computing device from dock 200) before proceeding. In step 4c, dock agent 210 can install the firmware update(s) on the respective peripheral(s) 300 and/or dock 200. As a result, dock 200 and peripherals 300 can have the best firmware for the workspace the user will establish before the user arrives at cube 601. This can eliminate any impact such firmware updates would otherwise cause if they were applied via user computing device 100 after the user has connected user computing device 100 to dock 200.

In some cases, it may not be possible to apply firmware updates to dock 200 and/or peripherals 300 before a user's workspace session. For example, some docks 200 may not have dock agent 210 which would make the process of FIGS. 4A-4D unavailable on such docks, or there may be a critical update that needs to be applied immediately even if a user has an active workspace session. FIGS. 5A-5G provide an example of how seamless peripheral selection and switching can be performed when firmware updates are performed on peripherals 300 during an active workspace session.

Figure 5A:
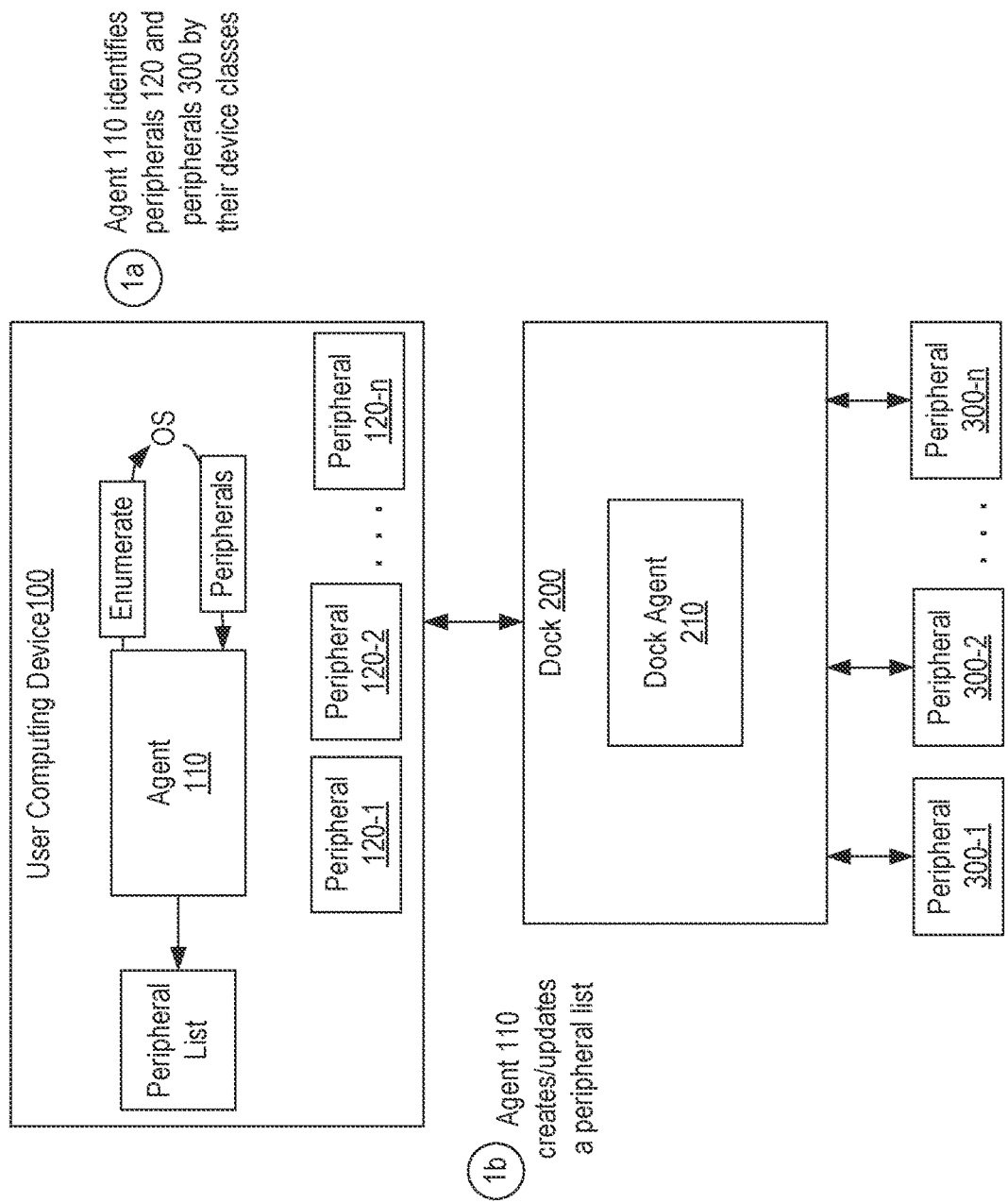

Turning to FIG. 5A, it is assumed that a user has connected user computing device 100 to dock 200, which may or may not include dock agent 210, to thereby form a workspace. In step 1a, agent 110 can identify peripherals 120 and peripherals 300 (i.e., the peripherals available in the workspace) by their device classes. For example, in a Windows-based implementation, agent 110 could call the SetupDiGetClassDevsExA function. In step 1b, agent 110 can create/update a peripheral list using the information obtained from step 1a. Agent 110 may perform steps 1a and 1b an initial time to create peripheral list (e.g., as part of startup) and any time a peripheral is connected to or disconnected from the workspace. To facilitate this, agent 110 could register for device connect and disconnect notifications.

FIG. 6 provides an example of a peripheral list that agent 110 could maintain in one or more embodiments of the present invention. This peripheral list groups the peripherals based on device class and can also provide various information about each peripheral. For purposes of the current example, it is assumed that peripherals 300-1 and 120-1 are the external 4K webcam and internal webcam respectively that are identified in the peripheral list under the camera device class.

Figure 5B:
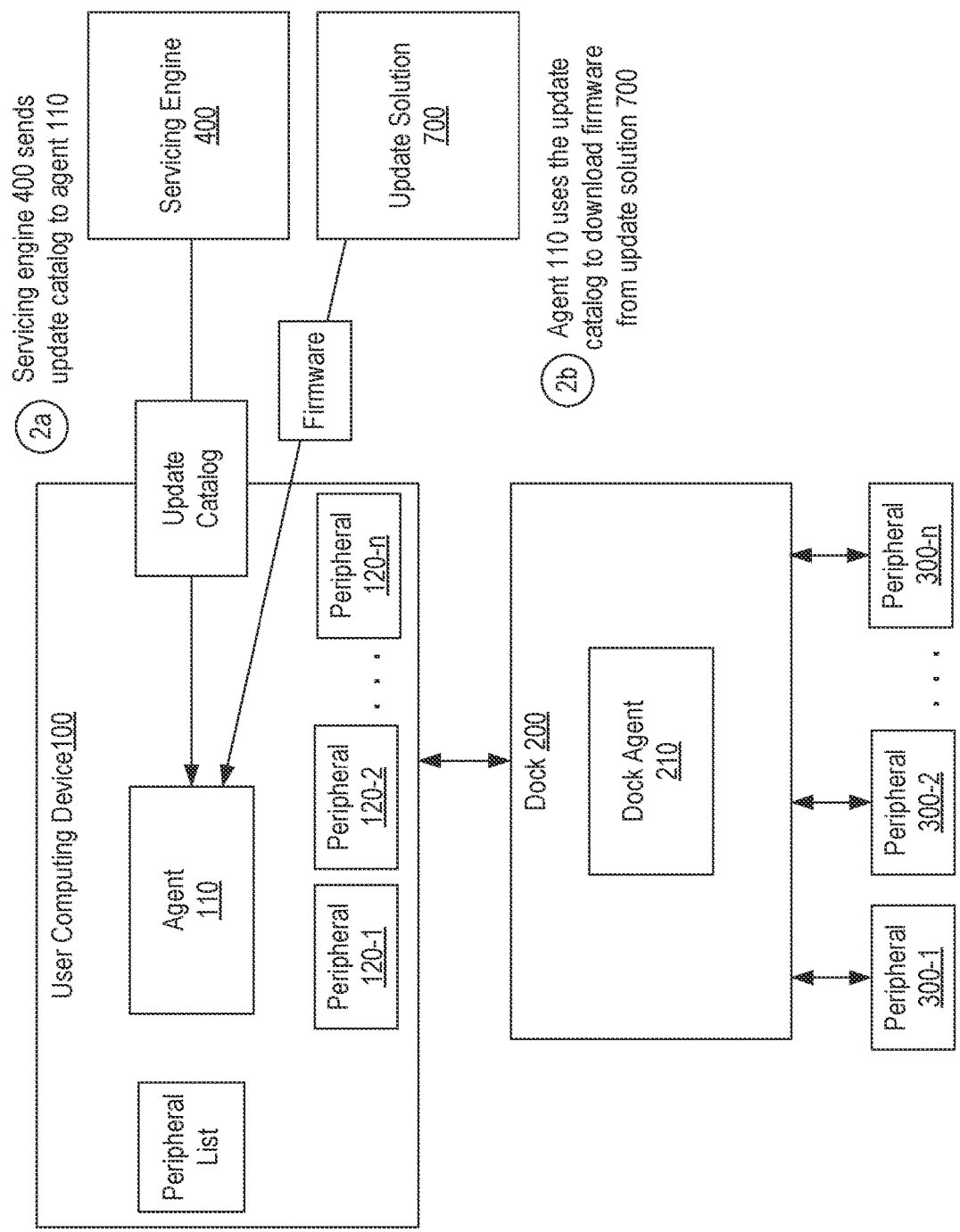

Turning to FIG. 5B, in step 2a, servicing engine 400 sends an update catalog to agent 110. As stated above, this could occur when a critical update needs to be deployed, when dock agent 210 is not available to enable the process of FIGS. 4A-4D, or for any other reason. Of importance is that the update catalog defines an update to one or more peripherals in the workspace that needs to be installed while the user has an active workspace session. In step 2b, agent 110 can use the update catalog to download the firmware from update solution 700. It is assumed that the update includes firmware only for peripheral 300-1.

Figure 5C:
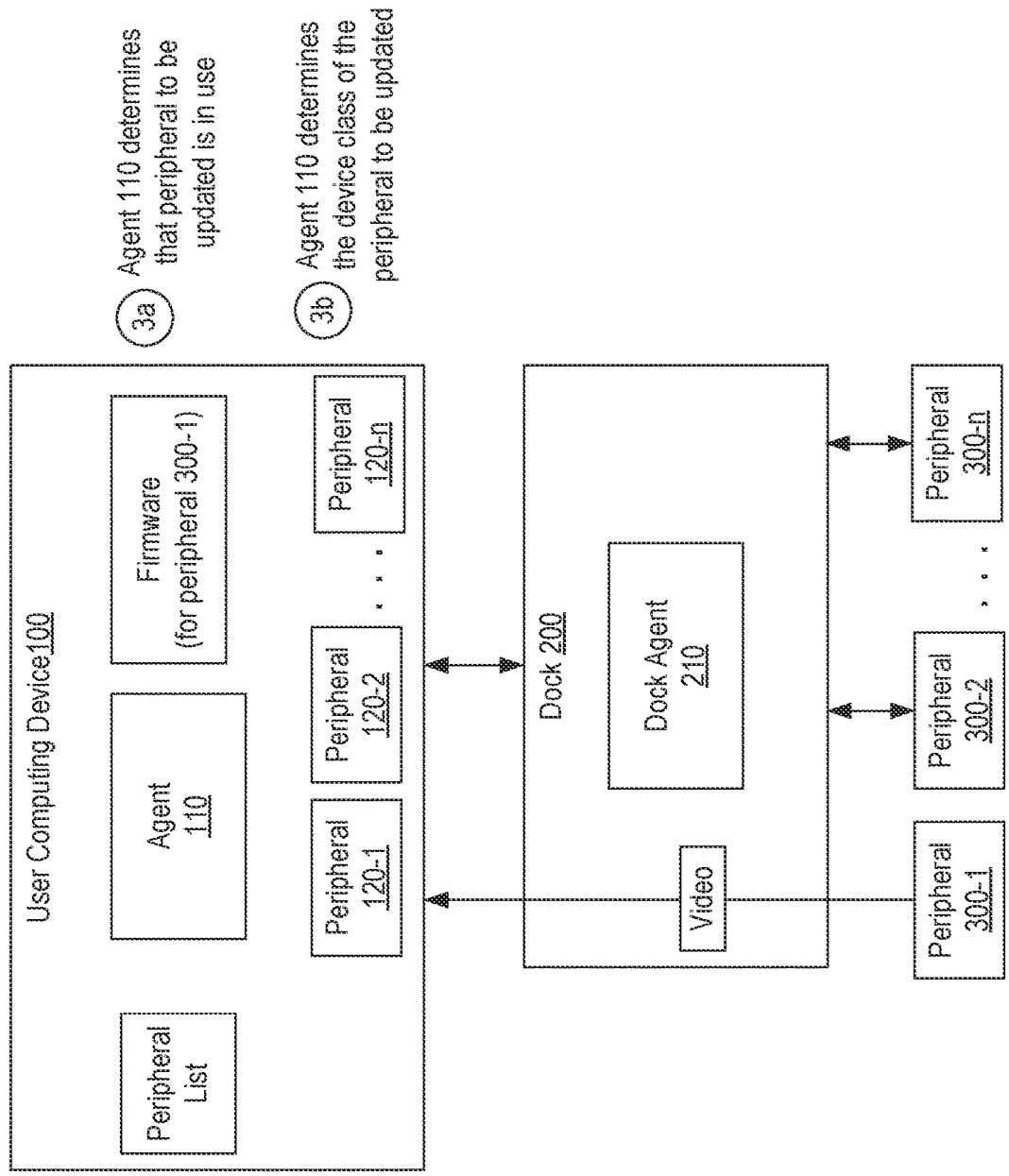

Turning to FIG. 5C, in step 3a, agent 110 can determine whether peripheral 300-1, the peripheral to be updated, is in use. For example, agent 110 could use the CreateFileA function to attempt to open the webcam. If the attempt fails (e.g., if agent 110 receives an error code rather than a handle to the peripheral), agent 110 can determine that the peripheral is in use. If the peripheral is not in use, agent 110 may proceed to update its firmware. However, if the peripheral is in use, agent 110 may determine the device class of the peripheral to be updated, which in this example is "camera."

Turning to FIG. 5D, in step 4, agent 110 may use the peripheral table to identify any other peripherals in the same device class as the peripheral to be updated. In this example, agent 110 will determine that the internal webcam (peripheral 120-1) is in the same device class as the external 4K webcam (peripheral 300-1) that is to be updated.

Figure 5E:
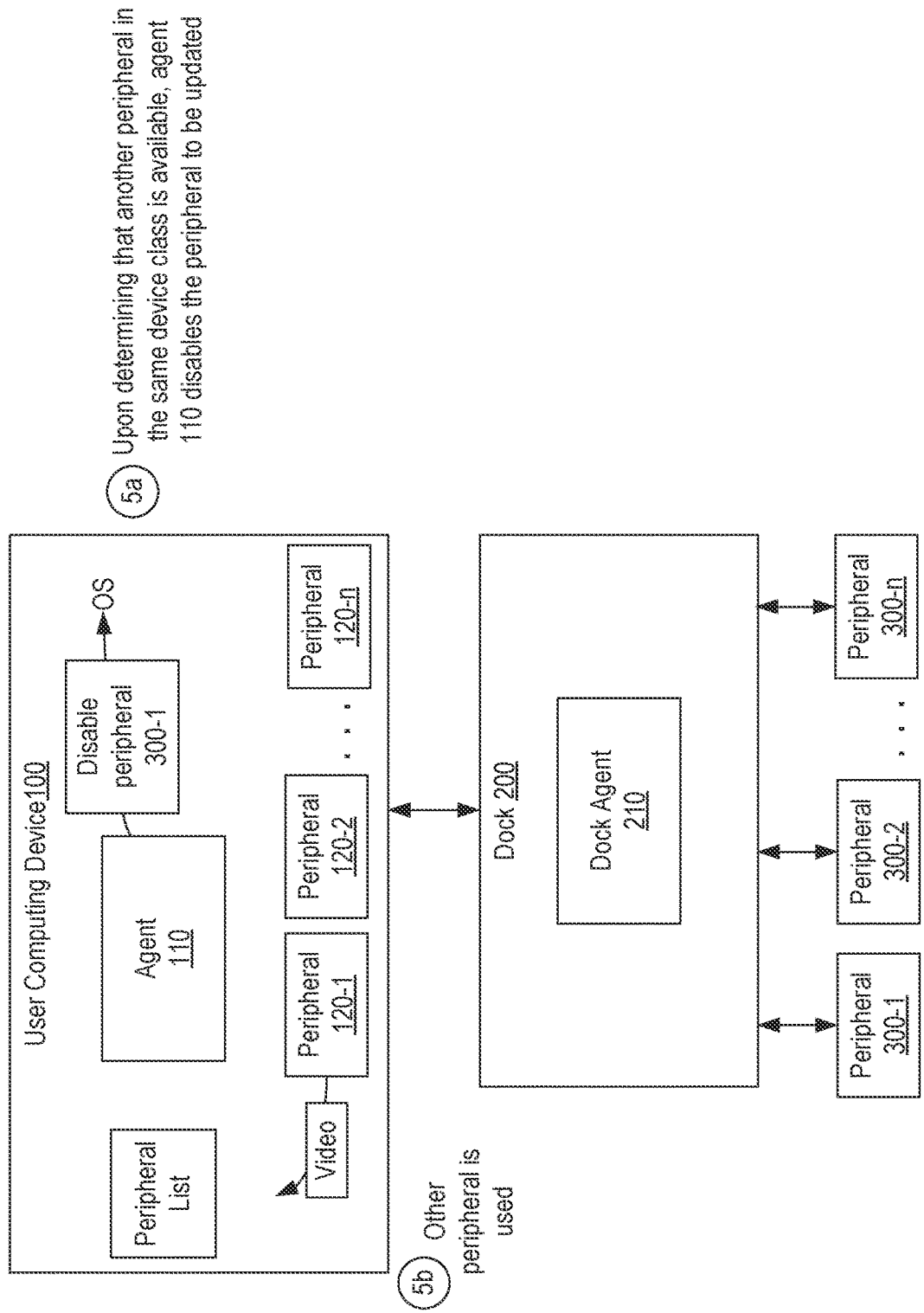

Turning to FIG. 5E, in step 5a, and upon determining that another peripheral in the same device class is available, agent 110 disables the peripheral to be updated. In this example, agent 110 may interface with the operating system, such as by calling the SetupDiChangeState function, to disable peripheral 300-1. As a result of disabling the external 4K webcam (peripheral 300-1) while it is in use, the internal webcam (peripheral 120-1) will be used given that it is in the same device class. Notably, if there are more than two peripherals in the same device class as a peripheral to be updated, agent 110 can disable the peripheral to be updated and all but one other peripheral in the same device class. This peripheral that is not disabled may be selected based on user preferences, available functionality, or any other criteria. In any case, after steps 5a and 5b, the workspace will have been seamlessly transitioned to use the internal webcam rather than the external 4K webcam.

Figure 5F:
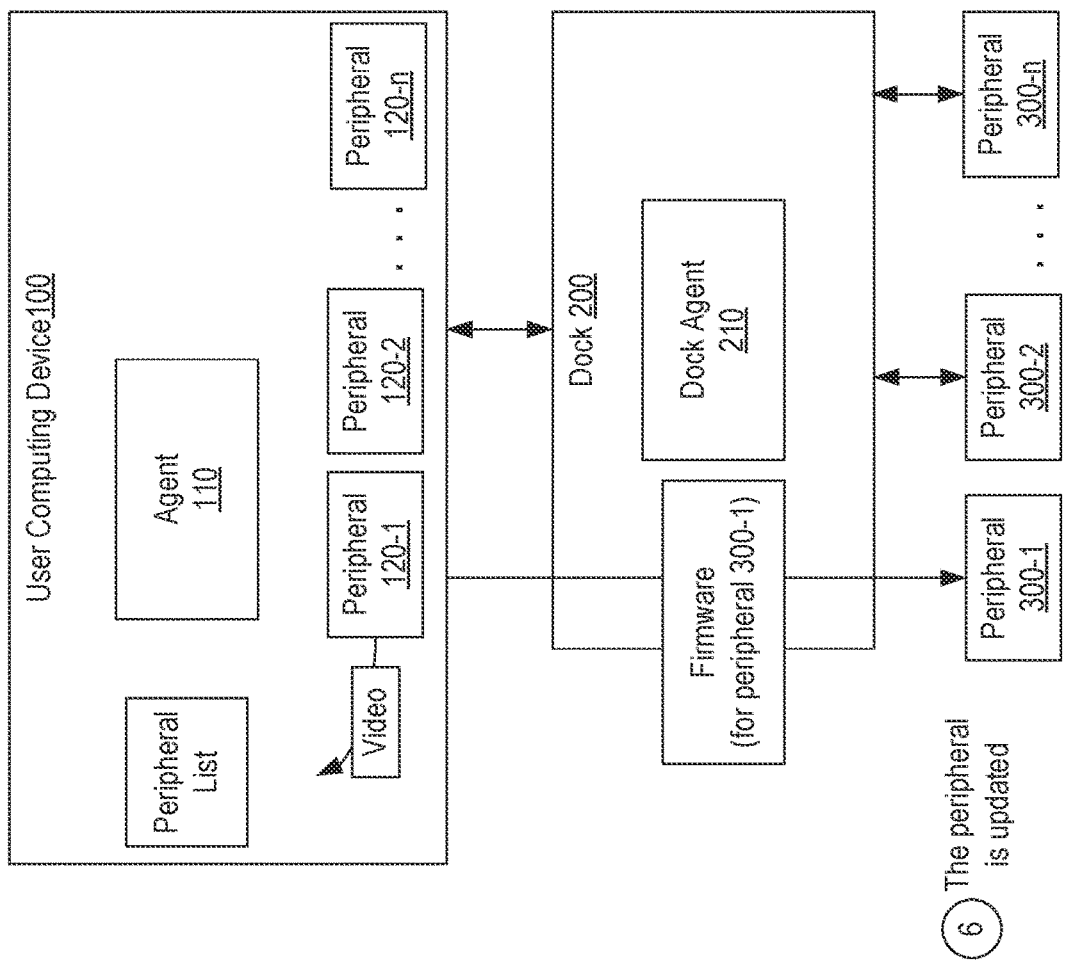

Turning to FIG. 5F, in step 6, the firmware update can be installed on peripheral 300-1. Because of the seamless transition to peripheral 120-1, this installation can be performed without impacting the user's productivity within the workspace.

Figure 5G:
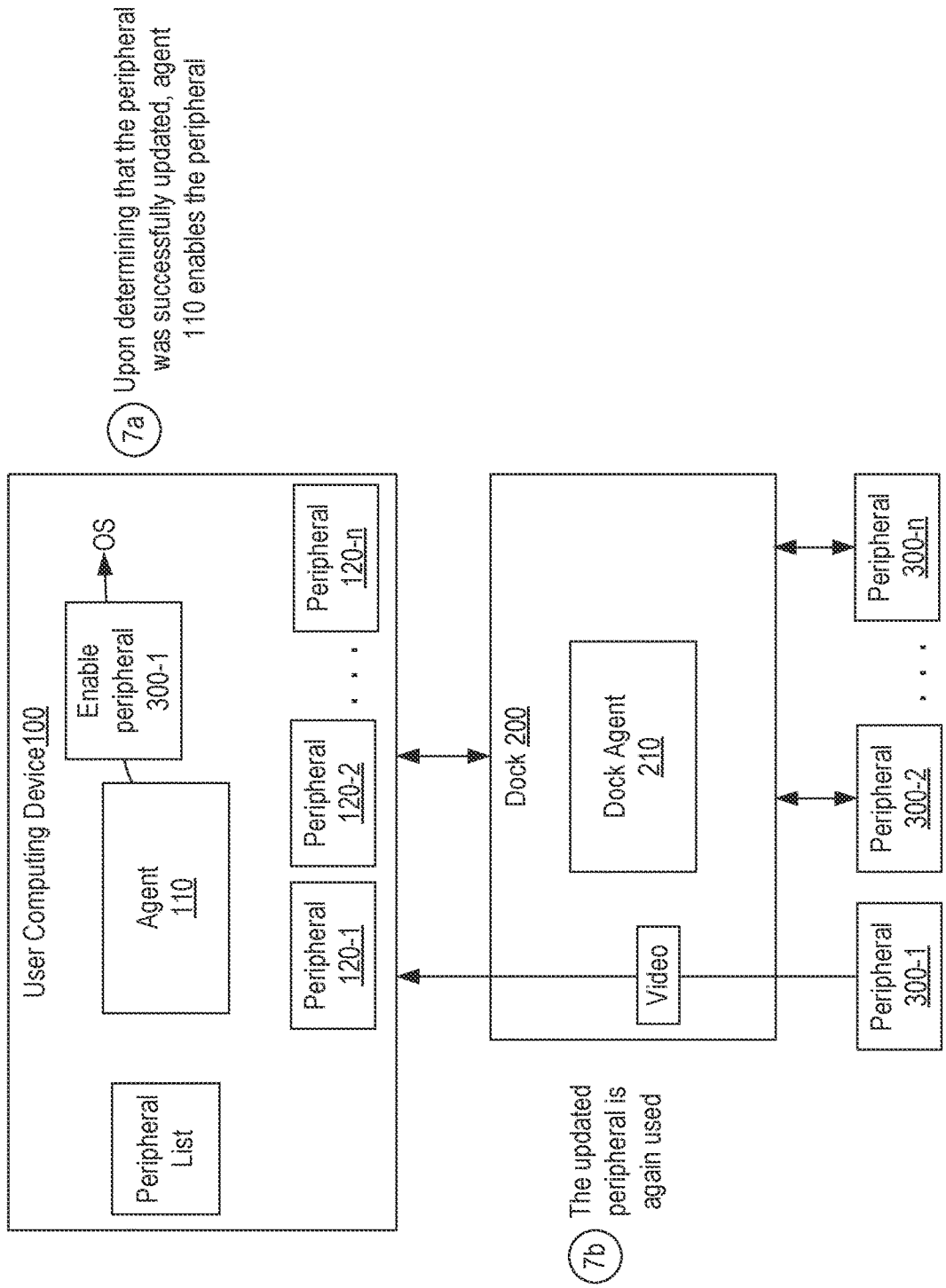

Turning to FIG. 5G, in step 7a, agent 110 can determine that the peripheral was successfully updated, and in response, can enable the peripheral. As a result, in step 7b, peripheral 300-1 will again be used as the webcam within the workspace. Accordingly, when an update needs to be made to the external 4K webcam while the user is in a video conference, agent 110 can seamlessly transition to using the internal webcam while the update is installed and then seamlessly transition back to using the external 4K webcam after the update is completed. This type of seamless switching can be performed with any other peripherals.

In some embodiments, agent 110 can perform similar functionality to seamlessly select features of peripherals. For example, if it is determined that a feature of peripheral 300-1 (e.g., background blurring) is not working while peripheral is in use, agent 110 may switch to peripheral 120-1 (or a virtual peripheral) to provide only that feature while continuing to use peripheral 300-1 for other features.

Embodiments of the present invention may comprise or utilize special purpose or general-purpose computers including computer hardware, such as, for example, one or more processors and system memory. Embodiments within the scope of the present invention also include physical and other computer-readable media for carrying or storing computer-executable instructions and/or data structures. Such computer-readable media can be any available media that can be accessed by a general purpose or special purpose computer system.

Computer-readable media are categorized into two disjoint categories: computer storage media and transmission media. Computer storage media (devices) include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other similar storage medium which can be used to store desired program code means in the form of computer-executable instructions or data structures and which can be accessed by a general purpose or special purpose computer. Transmission media include signals and carrier waves. Because computer storage media and transmission media are disjoint categories, computer storage media does not include signals or carrier waves.

Computer-executable instructions comprise, for example, instructions and data which, when executed by a processor, cause a general-purpose computer, special purpose computer, or special purpose processing device to perform a certain function or group of functions. The computer executable instructions may be, for example, binaries, intermediate format instructions such as assembly language or P-Code, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, smart watches, pagers, routers, switches, and the like.

The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices. An example of a distributed system environment is a cloud of networked servers or server resources. Accordingly, the present invention can be hosted in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description.

What is claimed:

1. A method for seamless peripheral selection and switching in a workspace, the method comprising:
   detecting that a workspace formed by a user computing device includes peripherals, each of the peripherals being an input device or an output device;
   retrieving a device class for each of the peripherals;
   determining that a first peripheral of the peripherals is to be updated while the first peripheral is being used to provide input to or output from a processor of the user computing device;
   identifying a second peripheral in the workspace that is in the same device class as the first peripheral;
   disabling the first peripheral to thereby cause the second peripheral to be used to provide the input to or the output from the processor of the user computing device; and
   causing the first peripheral to be updated.

2. The method of claim 1, wherein the first and second peripherals are one of:
   different displays;
   different cameras;
   different microphones;
   different speakers;
   different keyboards;
   different mice;
   different printers; or
   different authentication devices.

3. The method of claim 1, wherein determining that the first peripheral is to be updated comprises receiving a catalog that identifies an update.

4. The method of claim 3, wherein the update is firmware for the first peripheral.

5. The method of claim 1, wherein determining that the first peripheral is to be updated while the first peripheral is being used to provide the input to or the output from the processor of the user computing device comprises attempting to open the first peripheral upon determining that the first peripheral is to be updated.

6. The method of claim 1, further comprising:
   creating a peripheral list that groups the peripherals by device class.

7. The method of claim 6, wherein identifying the second peripheral comprises accessing the peripheral list.

8. The method of claim 1, further comprising:
   identifying a third peripheral in the workspace that is in the same device class as the first and second peripherals; and
   disabling the third peripheral in addition to disabling the first peripheral to thereby cause the second peripheral to be used.

9. The method of claim 8, further comprising:
   selecting the second peripheral over the third peripheral.

10. The method of claim 1, further comprising:
    determining that the first peripheral has been updated; and
    causing the first peripheral to again be used to provide the input to or the output from the processor of the user computing device.

11. The method of claim 1, further comprising:
    detecting that a user has booked a cube that includes a dock and peripherals;
    identifying an update to the dock or the peripherals; and
    causing the update to be applied before the user establishes a workspace using the dock and the peripherals.

12. The method of claim 11, wherein causing the update to be applied comprises sending a catalog to a dock agent executing on the dock.

13. The method of claim 1, further comprising:
    determining that a first feature provided by the first peripheral is unavailable while the first peripheral is in use;
    using the first feature provided by the second peripheral while the first peripheral is in use.

14. One or more computer storage media storing computer executable instructions which when executed implement a method for seamless peripheral selection and switching in a workspace, the method comprising:
    detecting that a workspace formed by a user computing device includes peripherals, each of the peripherals being an input device or an output device;
    receiving an update to a first peripheral of the peripherals;
    determining that the first peripheral is being used to provide input to or output from a processor of the user computing device;
    identifying one or more other peripherals having a same device class as the first peripheral;
    disabling the first peripheral; and
    causing the first peripheral to be updated.

15. The computer storage media of claim 14, wherein identifying the one or more other peripherals having the same device class as the first peripheral comprises identifying two or more other peripherals, and wherein the method further comprises:
    disabling all but one of the two or more other peripherals.

16. The computer storage media of claim 14, wherein the method further comprises:
  causing the first peripheral to again be used after the update to provide the input to or the output from the processor of the user computing device.

17. The computer storage media of claim 14, wherein the first peripheral is connected to a dock.

18. A method for updating peripherals comprising:
  detecting that a user has booked a cube that includes a dock and peripherals, each of the peripherals being an input device or an output device that is connected to the dock;
  identifying an update to one or more of the peripherals;
  notifying a dock agent executing on the dock of the update to the one or more of the peripherals;
  obtaining, by the dock agent, the update to the one or more of the peripherals; and
  installing the update before the user connects a user computing device to the dock such that the one or more peripherals are updated before a processor of the user computing device is connected to and can therefore use the one or more peripherals for input or output.

19. The method of claim 18, wherein identifying the update to one or more of the peripherals comprises determining a best firmware for a workspace that includes the user computing device, the dock and the peripherals.

20. The method of claim 18, wherein determining the best firmware for the workspace comprises retrieving details of the user computing device from a device management service.

* * * * *